Sept. 20, 1949.    F. O. JOHNSON    2,482,487
CONTROL DEVICE
Filed May 31, 1946    2 Sheets-Sheet 1
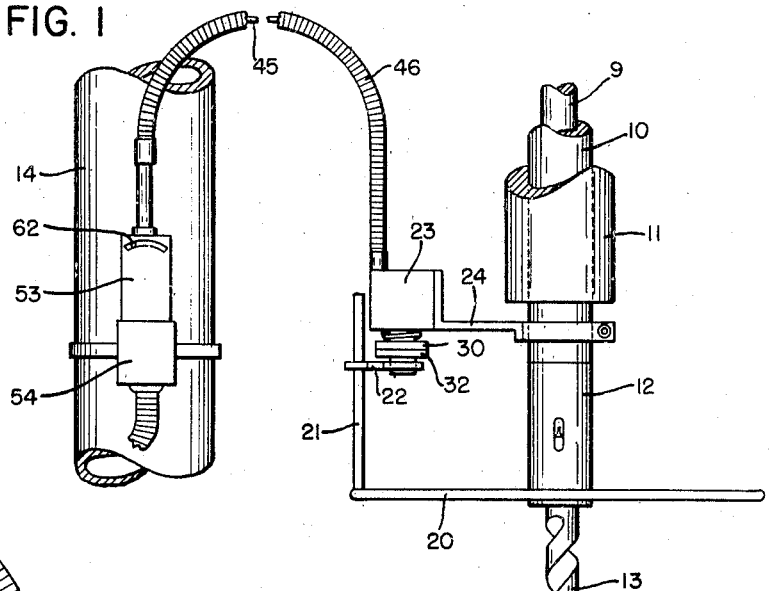
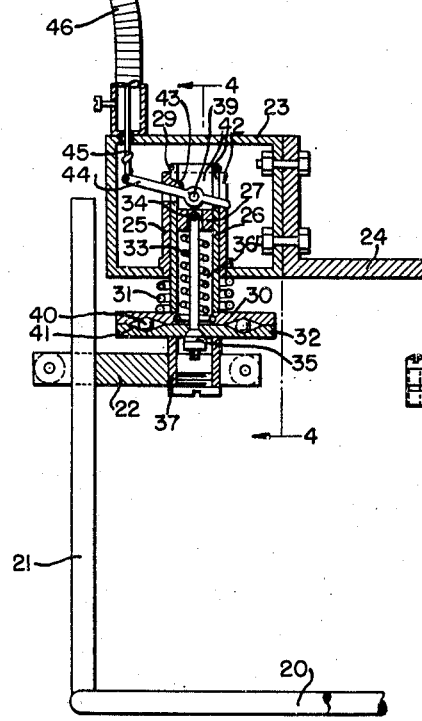
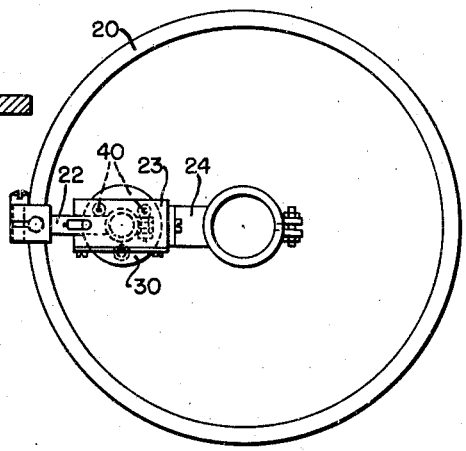
INVENTOR.
FREDRICK O. JOHNSON
BY Davis, Lindsey, Smith & Shonts
ATTORNEYS Sept. 20, 1949.   F. O. JOHNSON   2,482,487
CONTROL DEVICE
Filed May 31, 1946   2 Sheets-Sheet 2
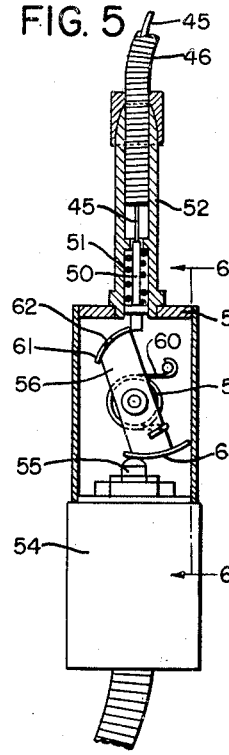
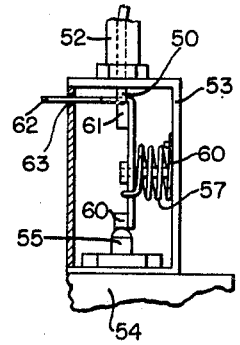
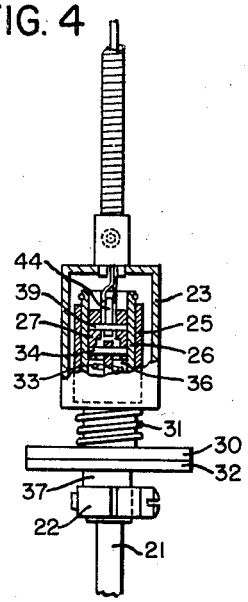
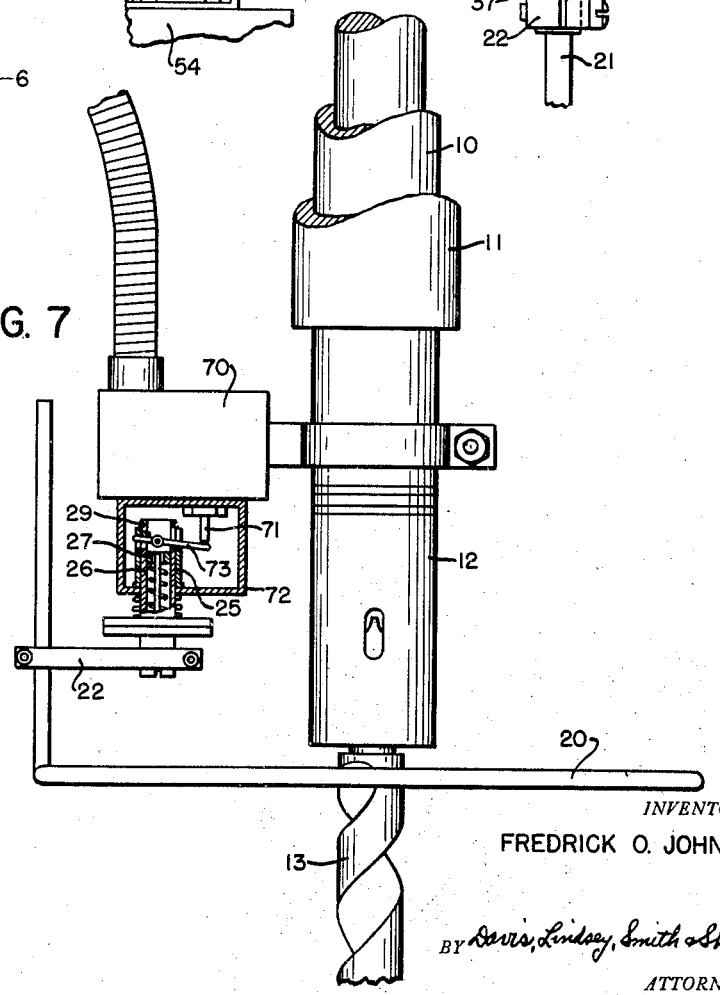
INVENTOR.
FREDRICK O. JOHNSON
BY Davis, Lindsey, Smith & Shonts
ATTORNEYS Patented Sept. 20, 1949

2,482,487

UNITED STATES PATENT OFFICE 2,482,487

CONTROL DEVICE

Frederick O. Johnson, Chicago, Ill.

Application May 31, 1946, Serial No. 673,679

12 Claims. (Cl. 74—107)

The invention relates generally to control devices and more particularly to a device for controlling the operation of a moving part of a machine, the device being adaptable either for controlling the normal operation of the moving part or as a safety device to stop operation of the part in an emergency.

The general object of the invention is to provide a novel device of the foregoing character, which is highly sensitive both from the standpoint of requiring only a small force to cause actuation thereof and from the standpoint of requiring movement through only a small distance to effect such actuation.

Another object is to provide a novel device of the foregoing character, having a part adapted to be moved to cause actuation of the device, such part being adapted, when moved in any direction or in any manner, to effect such actuation.

A further object is to provide a novel device of the foregoing character, which includes a micro switch as a control element, and mechanical means for operating the switch, such mechanical means being highly effective to perform its function and yet of simplified and inexpensive construction.

Still another object is to provide a novel device of the foregoing character, which is readily adjustable to meet different requirements and which may be easily applied to an existing machine.

Other objects and advantages will become apparent from the following description taken in connection with the accompanying drawings, in which:

Figure 1 is a fragmentary view of a drill press provided with a control device embodying the features of the invention.

Fig. 2 is a plan view of a portion of the control device shown in Fig. 1.

Fig. 3 is an enlarged vertical sectional view of a portion of the control device shown in Fig. 1.

Fig. 4 is a vertical sectional view taken substantially on the line 4—4 of Fig. 3.

Fig. 5 is a vertical sectional view of another portion of the control device shown in Fig. 1.

Fig. 6 is a vertical sectional view taken on the line 6—6 of Fig. 5.

Fig. 7 is a view similar to Fig. 1 but showing a modified form of the device.

As mentioned above, a control device embodying the features of the invention is adapted either for controlling the normal operation of a moving part of a machine or as a safety device to stop operation of the part in an emergency. When utilized in the first manner, the device is adapted to serve as an automatic means actuable by movement of the part to effect the movement thereof, as by reversing, stopping or changing the speed thereof, or to effect the movement of some other part of the machine at a certain stage in the movement of the given part. When used as a safety device, it is adapted, through electrical or other means, to be actuated either intentionally by the operator of the machine or merely by being engaged as an incident to the involuntary actions of the operator should he find himself endangered by having his clothing or a portion of his body caught in the machine. In the present instance, I have illustrated the device as of the latter type.

To give an understanding of the invention, I have shown the device for use in connection with a drill press, of which only fragmentary parts are shown. Thus, in Fig. 1, the parts of the drill press illustrated comprise a spindle 9 mounted in a quill 10 carried in a head 11 and provided with a chuck 12 to receive a drill 13. A machine of this character usually includes a column 14 for supporting the quill and spindle in movable relation to the column.

When embodied in this form, the invention includes a contact member placed in close proximity to the cutting tool, which, in this instance, is the drill 13, the contact member being movable in all directions so that any engagement therewith by the operator, whether intentional or involuntary, will be transposed into such movement as will effect cessation of both rotary and feeding movements of the drill 13. In the present instance, I utilize an electric switch for controlling the operation of the driving motor of the drill press. It is, of course, apparent that if feeding movement of the drill 13 is effected by means other than an electrical motor, for instance by hydraulic means, a suitable control valve or the like may be substituted for the switch, or the switch may control both the motor causing rotation of the drill, as well as a valve controlling feeding movement of the drill. The invention herein disclosed lies in the means for translating any movement of the contact member into such movement as will cause operation of the switch or valve, as the case may be.

The means for so translating the movements of the contact member comprises generally a control element movable in a predetermined direction and a pair of members which are movable independently of each other or conjointly with each other upon any form of movement of the contact member to effect movement of the control element in the predetermined direction. The pair of members are preferably concentrically arranged for sliding movement in either direction, either jointly or separately, and effect operation of a lever connected to the control element always in one direction.

In the specific embodiment shown in the drawings, the contact member takes the form of a ring 20 surrounding the drill 13 at a point where it will not interfere with normal operation of the drill press but may be readily contacted by the operator in an emergency. Other forms of contact member than a ring, of course, could be provided, but with a ring the contact member extends all the way around the drill and thus may be engaged from any angle. The ring 20 is provided with an upright portion 21 at its rear adjustably secured by a clamp 22. The clamp 22 is adapted to be connected to one of the two movable members so that separate or conjoint movement of the movable members will be effected for any movement of the ring 20.

The movable members are preferably carried in a casing 23 adjustably mounted by means of a bracket 24 on the quill 10 of the drill press to move therewith during the feeding of the drill. The casing 23 is provided with a fixed sleeve 25 (see Fig. 3) in which the movable members are mounted. The movable members, in the present instance, comprise a second sleeve 26 slidably mounted within the fixed sleeve 25 and a generally cylindrical member 27 slidably mounted within the second sleeve 26. The second sleeve terminates at its lower end in a flange 30 urged downwardly by a spring 31 interposed between the flange 30 and the casing 23. A spring ring 29 may be utilized on the upper end of the sleeve 26 to limit the downward movement effected by the spring 31. The cylindrical member 27 has a universal connection with a disc 32 held in engagement with the lower face of the flange 30 by such universal connection. The universal connection in the present instance comprises a rod 33 pivotally connected at its upper end, as at 34, to the cylindrical member 27. The lower end of the rod 33 is provided with a spherical nut 35 engaging a similarly shaped pocket in the lower face of the disc 32. The nut 35 is held in tight engagement with the disc 32 and the latter is held in engagement with the flange 30 by means of a spring 36 mounted within the second sleeve 26 and bearing at one end against the cylindrical member 27 and having its other end fixed to the flange 30.

To so connect the members 26 and 27 with the contact ring 20 as to cause movement of one or both of the members upon movement of the ring, the disc 32 is provided with a central, hollow stud 37 extending downwardly from its lower face and adjustably secured in the clamp 22. The flange 30 and the disc 32 are provided with a plurality of balls 40 (see Figs. 2 and 3) positioned in conical pockets 41 in the opposed faces of the flange and disc so that relative rotation between the flange and disc will cause separation thereof to the extent of the diameter of the balls 40 and thus will effect movement of one of the two members 26 and 27 relative to the other.

The upper ends of the two members 26 and 27 as well as the fixed sleeve 25 are provided with aligned transverse slots, indicated at 42. The slots in these parts are held in alignment by means of a lug 43 bent inwardly from the fixed sleeve 25 to extend into the slots in the two members 26 and 27. Extending transversely through the slots 42 is a lever 44 pivotally connected to the inner cylindrical member 27 as at 39. The lever 44 is connected to a Bowden wire 45 extending from the casing 23 through an armored cable 46 to actuate the switch, the Bowden wire in this instance constituting the control element and adapted to effect actuation of the switch when tensioned.

The Bowden wire 45, at its other end, is connected to a detent 50 (see Figs. 5 and 6), which is urged into its holding position by a spring 51, the detent 50 and spring 51 being mounted in a tube 52 extending upwardly from a casing 53 mounted on some fixed part of the drill press, such as the column 14. The detent 50 normally is in its holding position and serves to hold a spring-actuated means for operating a switch. In the present instance, the switch, which may be of the micro-switch type, is carried in a casing 54 and is provided with a push button 55 extending upwardly into the casing 53.

The means for operating the push button 55 when the detent 50 is withdrawn preferably comprises a lever 56 pivotally mounted intermediate its ends on a stud 57 rigid with the casing 53. The lever 56 is adapted to be spring operated and, to this end, is provided with a torsion spring 60 wrapped around the stud 57 and engaging the lever 56 at one end and secured at its other end to the casing 53. The lever 56, at its ends, is provided with flange portions, the flange portion at the lower end, indicated at 60, having its outer surface constituting a cam for actuating the push button 55 when the spring 60 causes rocking movement of the lever 56. The flange portion at the upper end of the lever 56, indicated at 61, is adapted to be engaged by the detent 50 to prevent swinging of the lever 56. When the detent 50 is withdrawn, the torsion spring 60 causes the lever to swing in a clockwise direction, as shown in Fig. 5, to depress the push button 55 and thus actuate the switch within the casing 54. The flange 61 at the upper end of the lever 56 also functions as a cam, when moved counterclockwise, to force the detent 50 upwardly for resetting the device. The flange 61 is provided with a forwardly extending handle 62 projecting through a slot 63 in the casing 53 so that the lever 56 may be readily reset.

In operation, the action of the two members 26 and 27, when the ring 20 is moved in any manner, is such as to cause tensioning of the Bowden wire 45 and thus release the detent 50 to effect operation of the switch. Thus, should the ring 20 be moved in such a manner as to cause rotation of the disc 32 relative to the flange 30, the balls 40 held between the disc and the flange will cause separation of the disc 32 and flange 30. If such separation results only in downward movement of the disc 32, the inner member 27 is pulled downwardly by means of the rod 33, and the lever 44 will thereby be swung downwardly to tension the Bowden wire 45. In such case, the lever 44 will be fulcrumed on the right-hand portion of the fixed sleeve 25, as illustrated in Fig. 3. Should such separation between the flange 30 and disc 32 result only in forcing the flange 30 upwardly against the pressure of the spring 31, the second sleeve member 26 will be forced upwardly to engage the lever and cause it to pivot on its pivotal connection with the inner member 27 to tension the Bowden wire. Should separation of the disc 32 and flange 30 result in both downward movement of the disc 32 and upward movement of the flange 30, a similar pivotal movement of the lever 44 will thereby be effected, the pivotal connection of the lever with the inner member 27, of course, being drawn downwardly in this instance.

Should there be such movement of the ring 20 as to cause downward movement of the disc 32 without rotation, the lever 44 will be drawn downwardly by the inner member 27 with the right-hand portion of the fixed sleeve 25 functioning as the fulcrum for the lever. In this instance, when the disc 32 is moved downwardly, the spring 31, of course, similarly tends to move the flange 30 downwardly, but such movement of the flange and the second sleeve 26 will have no effect on the lever 44. Should the flange 30 and the disc 32 be moved upwardly by movement of the ring 20, both the members 26 and 27 will move upwardly, and such movement of the member 27 will cause the lever 44 to swing in a direction to tension the Bowden wire, since the lever will then fulcrum on lug 43 of the outer casing which extends into the slots 42.

Other movements of the ring 20 may tend to cause the disc 32 to tilt relative to the flange 30, but in all movements of the inner member 27 or outer member 26, independently of each other or conjointly, the lever 44 will be caused to move in a direction to tension the Bowden wire 45 and thus effect operation of the push button 55 of the switch, as heretofore described.

In Fig. 7, I have shown another form of the device in which a switch is mounted in a casing 70 carried directly on the quill 10 of the drill press. In this instance, the switch is provided with a push button 71 extending downwardly into a casing 72 in which the pair of relatively slidable members 26 and 27 are mounted. With this construction, the push button 71 constitutes the control element of the combination and is adapted to be actuated by a lever 73 carried by the inner member 27 in the same manner as in the other form of the device but extending to the opposite side thereof so as to directly engage the push button 71. In this form, as in the previously described form, any movement of the ring 20 will result in such movement of the lever 73 as to force the push button 71 upwardly and thus actuate the switch.

The switch, in this instance, as well as the switch contained within the casing 54, may be in the main line of the electrical circuit utilized in operating the drill press and may be adapted to be opened when the push button 71 or the push button 55 is actuated, or either of these switches may be adapted to be closed on such operation of the push button in order to actuate a relay, resulting in control of the electrical circuit for the machine.

With a device constructed in the manner heretofore described, high sensitivity is obtained both from the standpoint of requiring only a small force acting on the ring 20 to result in actuation of the switch or from the standpoint of requiring only a relatively small movement of the ring 20 to result in such actuation. Movement of the ring 20 in any direction or in any manner results in actuation of the switch, the structure for translating any such movement of the ring 20 being simple in character and inexpensive to manufacture, as will be apparent from the foregoing description. The device may be readily applied to an existing machine since the casings 53 or 70 may be easily secured to the quill or other moving part of a machine while the switch casing 54 may be mounted at any convenient location and the switch may be readily connected into the electrical circuit in any desired manner.

I claim:

1. A control device of the character described comprising lever means movable in one direction for effecting control, a contact element mounted for movement in all directions, a pair of operating members each being movable independently of the other to move said lever means in said one direction, and means operatively connecting said contact element with said operating members whereby one of said operating members is actuated by said contact element when moved in certain directions and the other when the contact element is moved in other directions.

2. A control device of the character described comprising lever means movable in one direction for effecting control, a contact element mounted for movement in all directions, a pair of operating members adapted when actuated to move said lever means in said one direction, and means operatively connecting said contact element with said operating members whereby one of said operating members is actuated by said contact element when moved in certain directions and the other when the contact element is moved in other directions, and both of said operating members are actuated by said contact element when moved in still other directions.

3. A control device of the character described comprising a control element movable in a given direction to effect control, a second element operable in a predetermined direction to move said control element in said given direction, a contact element movable in all directions, and means connecting said contact element with said second element whereby movement of said contact element in any direction effects operation of said second element in said predetermined direction, said means comprising a pair of members movable independently of each other or conjointly by said contact element to operate said second element.

4. A control device of the character described comprising a movable control element, a lever movable in one direction for actuating said element, a contact element movable in all directions, and means for effecting movement of said lever in said one direction upon movement of said contact element in any direction, said means comprising a pair of members movable independently of each other or conjointly by said contact element to operate said lever, and a fixed member providing a fulcrum for said lever for certain movements of said pair of members, one of said members being the fulcrum for said lever for other movements of said pair of members.

5. A control device of the character described comprising a movable control element, a lever movable in one direction for actuating said control element, a contact element movable in all directions, and means for effecting movement of said lever in said one direction upon movement of said contact element in any direction, said means comprising a generally cylindrical member pivotally connected to said lever, and a sleeve member slidably mounted on said cylindrical member, said members being movable independently of each other or conjointly by said contact element to operate said lever.

6. A control device of the character described comprising a movable control element, a lever movable in one direction for actuating said control element, a contact element movable in all directions, and means for effecting movement of said lever in said one direction upon movement of said contact element in any direction, said means comprising a generally cylindrical member pivotally connected to said lever, a fixed sleeve, and a sleeve member slidable on said cylindrical member and in said fixed sleeve, said members being movable independently of each other or conjointly by said contact element to operate said lever with said fixed sleeve serving as a fulcrum for said lever for certain movements of said members.

7. A control device of the character described comprising a movable control element, a contact element, a pair of members movable independently of each other or conjointly by said contact element, said members comprising a generally cylindrical member and a sleeve member slidably supporting said cylindrical member, a fixed sleeve slidably supporting said sleeve member, said members and said fixed sleeve having aligned transverse slots, and a lever extending through said slots and pivoted to said cylindrical member, said lever being movable in one direction by independent or conjoint movement of said members.

8. A control device of the character described comprising a control element movable in a given direction to effect control, a contact element movable in all directions, and means for moving said control element in said given direction upon movement of said contact element in any direction, said means comprising a fixed sleeve, a second sleeve slidable within said fixed sleeve, a member slidable within said second sleeve, said sleeves and said member having aligned transverse slots at one end, a lever connected to said control element and extending through said slots and pivoted to said member with the slot therein, and a lug on said fixed sleeve extending into the slots in said second sleeve and said member to hold said slots in alignment.

9. A control device of the character described comprising a control element movable in a given direction to effect control, a contact element movable in all directions, and means for moving said control element in said given direction upon movement of said contact element in any direction, said means comprising a support, a sleeve slidably mounted in said support and having a flange at one end, a disc in face-to-face relation with said flange and rigid with said contact element, a member slidably mounted in said sleeve, a lever mounted on said member and connected to said control element and adapted to be engaged by said sleeve on certain movements thereof, and a connector for connecting said disc with said member.

10. A control device of the character described comprising a control element movable in a given direction to effect control, a contact element movable in all directions, and means for moving said control element in said given direction upon movement of said contact element in any direction, said means comprising a support, a sleeve slidably mounted in said support and having a flange at one end, a disc in face-to-face relation with said flange and rigid with said contact element, a member slidably mounted in said sleeve, a lever pivoted on said member and connected to said control element and adapted to be engaged by said sleeve on certain movements thereof, and a rod pivotally connected at one end to said member and having at its other end a universal engagement with said disc.

11. A control device of the character described comprising a control element movable in a given direction to effect control, a contact element movable in all directions, and means for moving said control element in said given direction upon movement of said contact element in any direction, said means comprising a support, a sleeve slidably mounted in said support and having a flange at one end, a disc in face-to-face relation with said flange and rigid with said contact element, a member slidably mounted in said sleeve, a lever pivoted on said member and connected to said control element and adapted to be engaged by said sleeve on certain movements thereof, a rod pivotally connected at one end to said member and having universal engagement at its other end with said disc, and a spring interposed between said member and said disc for holding said rod in engagement with said disc.

12. A control device of the character described comprising a control element movable in a given direction to effect control and spring-pressed in the opposite direction, a contact element movable in all directions, and means for moving said control element in said given direction in response to movement of said contact element in any direction, said means comprising a support, a sleeve slidably carried by said support and having a flange at one end, a member slidable within said sleeve, a lever pivoted on said member and connected to said control element, a disc in face-to-face relation with said flange, a rod providing a universal connection between said member and said disc, and a spring interposed between said support and said flange.

FREDERICK O. JOHNSON.

REFERENCES CITED

The following references are of record in the file of this patent:

UNITED STATES PATENTS

| Number | Name | Date |
| --- | --- | --- |
| 1,540,400 | Kellan | June 2, 1925 |
| 1,891,998 | Nafziger | Dec. 27, 1932 |
| 2,263,134 | Hoza | Nov. 18, 1941 |
| 2,303,029 | Dillman | Nov. 24, 1942 |
| 2,337,143 | Yanchenko | Dec. 21, 1943 |